Figure 1:
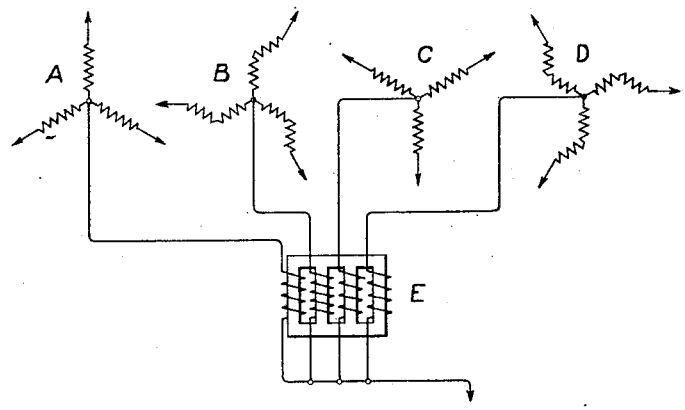

Feb. 24, 1931. J. C. READ 1,794,246

ELECTRICAL APPARATUS

Filed Dec. 31, 1927

Inventor:
John C. Read
by *Alexander S. Lunt*
His Attorney

Patented Feb. 24, 1931

1,794,246

UNITED STATES PATENT OFFICE

JOHN C. READ, OF CREWKERNE, ENGLAND, ASSIGNOR TO GENERAL ELECTRIC COMPANY, A CORPORATION OF NEW YORK

ELECTRICAL APPARATUS

Application filed December 31, 1927, Serial No. 244,004, and in Great Britain January 21, 1927.

My invention relates to electrical apparatus comprising a rectifier and a plurality of main transformer windings interconnected through the windings of an interphase transformer, and has for its principal object the provision of an improved arrangement of the various transformer windings whereby the constructional and operating costs of such apparatus are greatly reduced.

In the construction of large rectifiers of the mercury vapor type, for example, it is sometimes desirable to supply the anodes of the rectifier with 12 or more phases, the multiplication of the number of phases having to be effected by the transformer.

The transformer secondary winding must necessarily possess a star point, since this star point forms the positive pole of the direct current system supplied by the rectifier. A simple 12-phase star-connected secondary winding would have the disadvantage for this service that, owing to the small degree of overlap of the currents of successive anodes, and the high reactance between adjacent anodes, the transformer would be costly due to inefficient utilization of its secondary winding, and the rate of fall of the direct current voltage with increasing load would be too rapid. It is possible to overcome this difficulty by splitting up the 12-phase secondary winding into four symmetrical 3-phase star-connected systems, the star points of two of the systems being connected by an interlinking transformer, the star points of the other two systems by another interlinking transformer, and the resulting star points of the two pairs of systems being connected by a third interlinking transformer.

This arrangement satisfactorily obtains the desired qualities of good utilization of the secondary winding and small voltage drop, but it has the disadvantage of requiring three separate interlinking transformers.

In accordance with the present invention this disadvantage is overcome by splitting up the 12 phase secondary winding into four symmetrical 3 phase star connected systems and bringing the leads from the respective neutral points each to one of the limbs of a four limbed transformer thereby obviating the expense of a plurality of transformers.

The economies effected by this arrangement are due to a number of causes. In the first place, the economy of material is greater because the same iron is used to carry the 180 cycle fluxes and the 360 cycle flux. The combination of these fluxes of different frequencies gives a total flux which is less than their arithmetical sum. At the same time, the combination of the two 180 cycle transformers in one unit results in the normal saving obtained by combining two single phase transformers into one polyphase transformer.

There as also a saving due to the fact that no coils have to be wound for currents larger than that coming from one of the neutrals of the main transformer, whereas the 360 cycle transformer must otherwise be wound for double this current, and, where large currents are involved, a coil of such a type is very expensive due to its heavy copper windings.

Another and very important economy results from the use of a single interphase transformer core structure of simple form in the place of three separate cores which must first be clamped independently and then fastened together so as to be placed in a common tank. By making the depth of the four-legged core somewhat greater than its width, it can be made to fit the clamps and tank of a standard three-phase transformer, thus allowing the use of parts which are standard for other types of transformers.

The invention will be better understood from the following description when considered in connection with the accompanying drawings and its scope will be pointed out in the appended claims.

Figure 2:
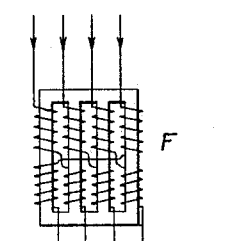
Figure 5:
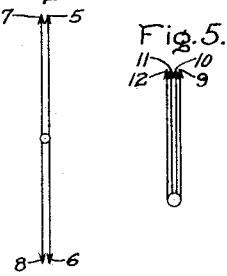
Figure 6:
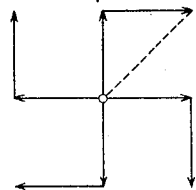
Figure 7:
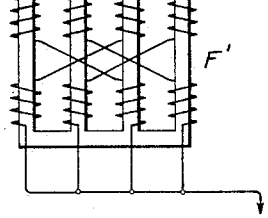

In the accompanying drawings Figs. 1, 2 and 7 diagrammatically illustrate different methods of carrying this invention into effect; and Figs. 3 to 6 and 8 relate to the operation of the apparatus of Figs. 1, 2 and 7.

In carrying out the invention as shown diagrammatically in Fig. 1, A, B, C and D are four 3-phase star-connected systems, each symmetrical as far as itself is concerned, and each displaced by 30 electrical degrees from any of the others, so that together they form a 12-phase secondary winding. The leads from their respective neutral points are brought each to one leg of a 4-legged interphase transformer E, the windings on all the four legs of E being in the same direction and joined together at a common star point after passing through E. This common star point forms the positive pole of the direct current system, while the negative pole of the direct current system is connected to the cathode of the rectifier in the usual way. Alternatively, the interphase transformer may be zigzag-connected as shown at F, Fig. 2; that is, each leg of the core carries two windings in opposite directions, connected respectively to the start points of two of the 3-phase systems displaced 30 degrees apart; in this way the direct current ampere turns from yoke to yoke of the interphase transformer are made zero without altering the effect of the interphase transformer on the alternating current components of the currents flowing through it.

More generally, it is possible to obtain a similar effect in any polyphase star-connected system, by splitting up the system into a number of separate star-connected systems, each symmetrical in itself, and connecting the star points of these to an interphase transformer having a number of legs equal to the number of systems into which the original polyphase system is split up, and connecting the leads from these separate star points to a common star point through this interphase transformer, which is connected either simply in star or in zigzag-star.

The method of operation of interphase transformers such as E and F is as follows:

The function of the interphase transformer is to enable each of the star-connected groups, such as A, to operate like a three-phase rectifier. In order to do this, the winding of the interphase transformer has to absorb the difference voltage between the rectified voltage produced by a three-phase group, such as A, and the arithmetical mean of the rectified voltages produced by all the four groups A, B, C and D. This difference voltage consists of a series of harmonic voltages, the orders of the harmonics including all the multiples of three except multiples of twelve, the order of a harmonic being the ratio of its frequency to the frequency of the supply; so that the harmonic whose order is 3 has a frequency three times the supply frequency. The test of whether an interphase transformer such as E or F is capable of producing the desired result is, therefore, to determine whether it is capable of absorbing all these harmonic voltages.

Figure 3:
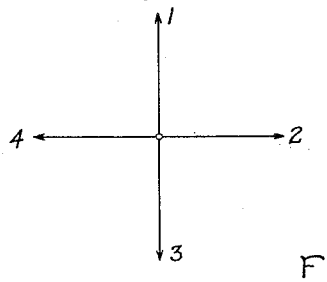
Figure 4:
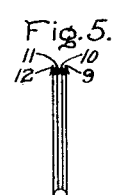

Considering first the third harmonic, let vector 1, Fig. 3, represent the third harmonic voltage to be absorbed between the neutral point of group A and the main star point. Since group B is displaced 30° from group A, its third harmonic voltage will be displaced 90° from that produced by group A, and is represented by vector 2. Similarly, vectors 3 and 4 represent the third harmonic voltages produced by groups C and D. Consequently, the four third harmonic voltages to be absorbed form a symmetrical four-phase system. Since E is a four-legged transformer, the flux in it will generate electromotive forces in its windings which will wholly absorb the third harmonic voltages. In a similar way, 5, 6, 7 and 8, Fig. 4, are respectively the voltage vectors of the sixth harmonic voltages between A, B, C and D and the main star point, and these also are absorbed by the interphase transformer. Similarly, the ninth, fifteenth, eighteenth, and so on, harmonics are absorbed by the interphase transformer. For the twelfth, twenty-fourth, and so on, harmonics, however, the vector diagram is as shown in Fig. 5, all the four harmonic voltages tending to magnetize the core of the interphase transformer in the same direction at every instant. Since the return path for this flux is through the air from yoke to yoke, it is clear that the interphase transformer will not absorb these voltages; but this is of no importance since the twelfth, twenty-fourth, and so on, harmonics are not among those which have to be absorbed. Consequently, the transformer E absorbs all the harmonic voltages required of it.

When the transformer F, Fig. 2, is used instead of the transformer E, for the third harmonic, the vector diagram of the magnetomotive forces produced on each leg is as shown in Fig. 6. Since each leg of the transformer F has two windings producing magnetomotive forces 90 electrical degrees apart, the resulting magnetomotive force on each leg again forms a symmetrical four-phase system, and consequently the third harmonic voltage is again successfully absorbed by the interphase transformer. Similar reasoning shows that the transformer F will also absorb all the remaining harmonic voltages present, namely, the sixth, ninth, fifteenth and so on. Additional unwound legs may be added to any transformer with zigzag connection, such as the transformer F, without essentially effecting the operation of it.

By an extension of the same reasoning, it is clear that a similar type of interphase transformer can be employed on any multi-phase rectifier transformer connection, where the number of phases, $p = m.n$, where $m$ and $n$ are integers. The $p$-phase star-connected secondary winding is then divided into $m$ symmetrical $n$-phase star-connected groups displaced $$\frac{360}{p}$$

electrical degrees apart, and the $m$ neutral points are connected together by an interphase transformer having $m$ legs. Each leg may have one winding on it, connected to the neutral point of one of the $m$ groups; or, each leg may have two windings in opposite directions on it, connected respectively in series with different ones of the $m$-star points, thus constituting a zigzag connection of the interphase transformer.

Figure 8:
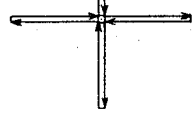

In choosing the type of zigzag connection, that is to say, in choosing which legs of the interphase transformer the two windings from a given one of the $m$ groups shall be wound on, a number of alternative arrangements which will be satisfactory are always available, but certain arrangements have to be avoided. Thus, if the four-legged interphase transformer F, Fig. 2, had been connected as shown at F' in Fig. 7, then the vector diagram of the magnetomotive forces produced on each leg by the sixth harmonic would have been as shown in Fig. 8, that is, no resulting magnetomotive force would be produced on any of the legs for this harmonic, and consequently the sixth harmonic voltage would not be absorbed. By this method of test, these zigzag connections which have to be avoided can easily be determined.

What I claim as new and desire to secure by Letters Patent of the United States, is:

1. A rectifying apparatus comprising four three phase star-connected systems each provided with a neutral terminal, a core having four legs, and a plurality of windings each wound on a different leg of said core and each connected between a common point and the neutral terminal of a different one of said systems, to absorb the third harmonic of the supply frequency and all multiples of said harmonic except the twelfth and multiples thereof.

2. A system of connections for electric arc rectifiers having twelve or more phases, in which the $p$-phase star-connected secondary winding is divided into four symmetrical $n$-phase star-connected groups displaced $$\frac{360}{p}$$

electrical degrees apart, characterized by the feature that the star points of the four groups are connected together through a common interphase transformer having four legs, with one winding on each leg, all the windings in the same direction, and each of the windings connected to a different one of the four star points, to absorb the $n$th harmonic of the supply frequency and all multiples of said harmonic except the 4 $n$th and multiples thereof.

3. A system of connections for electric arc rectifiers having twelve or more phases, in which the $p$-phase star-connected secondary winding is divided into four symmetrical $n$-phase star-connected groups displaced $$\frac{360}{p}$$

electrical degrees apart, characterized by the feature that the star points of the four groups are connected together through a common interphase transformer having four legs, with two windings on each leg, the windings being wound in opposite directions and zigzag-connected, to absorb the $n$th harmonic of the supply frequency and all multiples of said harmonic except the 4 $n$th and multiples thereof, substantially as described.

In witness whereof, I have hereunto set my hand this 30th day of December, 1927.

JOHN C. READ.